(12) United States Patent
Lipcsei et al.

(10) Patent No.: US 7,598,718 B2
(45) Date of Patent: *Oct. 6, 2009

(54) CONTROLLER FOR DC TO DC CONVERTER

(75) Inventors: Laszlo Lipcsei, San Jose, CA (US); Serban-Mihai Popescu, Campbell, CA (US)

(73) Assignee: O2Micro International Limited, Georgetown, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 11/733,518

(22) Filed: Apr. 10, 2007

(65) Prior Publication Data

US 2007/0176587 A1 Aug. 2, 2007

Related U.S. Application Data

(63) Continuation of application No. 11/269,951, filed on Nov. 9, 2005, now Pat. No. 7,202,650, which is a continuation of application No. 10/389,037, filed on Mar. 14, 2003, now Pat. No. 6,965,221.

(60) Provisional application No. 60/425,553, filed on Nov. 12, 2002.

(51) Int. Cl.
*G05F 1/40* (2006.01)

(52) U.S. Cl. .................... 323/284; 323/285

(58) Field of Classification Search ............ 363/16–20, 363/21.4, 21.7, 21.9, 95–97; 323/282–286, 323/266, 268, 272, 269
See application file for complete search history.

(56) References Cited

U.S. PATENT DOCUMENTS

| | | | |
|---|---|---|---|
| 4,727,308 A * | 2/1988 | Huljak et al. | ............... 323/222 |
| 5,430,366 A | 7/1995 | Erckert et al. | |
| 5,949,226 A | 9/1999 | Tanaka | |
| 6,288,524 B1 | 9/2001 | Tsujimoto | |
| 6,300,777 B1 * | 10/2001 | Ribarich | ..................... 324/652 |
| 6,326,774 B1 | 12/2001 | Mueller et al. | |
| 6,396,250 B1 * | 5/2002 | Bridge | ........................ 323/283 |
| 6,531,853 B2 | 3/2003 | Umemoto | |

(Continued)

FOREIGN PATENT DOCUMENTS

EP 0765021 3/1997

(Continued)

OTHER PUBLICATIONS

Japanese Office Action issued in Application No. 2005507156, dated Aug. 14, 2007 (6 pages).

(Continued)

*Primary Examiner*—Rajnikant B Patel
(74) *Attorney, Agent, or Firm*—Grossman, Tucker, Perreault & Pfleger, PLLC

(57) ABSTRACT

A DC to DC converter to convert an input voltage to an output voltage. The DC to DC converter may include a pair of switches including a high side switch and a low side switch, an inductor coupled to the pair of switches; and a controller. The controller may be configured to estimate a zero crossing of an inductor current through the inductor without directly measuring said inductor current. An associated method is also provided.

10 Claims, 5 Drawing Sheets

U.S. PATENT DOCUMENTS

| | | |
|---|---|---|
| 6,541,947 B1 | 4/2003 | Dittmer et al. |
| 6,791,306 B2 | 9/2004 | Walters et al. |
| 7,017,087 B2 | 3/2006 | Panis et al. |
| 2002/0060559 A1 | 5/2002 | Umemoto |
| 2002/0074975 A1 | 6/2002 | Culpepper et al. |
| 2004/0076119 A1 | 4/2004 | Aronson et al. |
| 2005/0079822 A1 | 4/2005 | Boose et al. |
| 2005/0154946 A1 | 7/2005 | Mitbander et al. |

FOREIGN PATENT DOCUMENTS

| | | |
|---|---|---|
| EP | 0967713 | 12/1999 |
| EP | 0726160 B1 | 12/2002 |
| JP | 61177161 | 8/1986 |
| JP | 08289535 | 11/1996 |
| JP | 08294269 | 11/1996 |
| JP | 08340670 | 12/1996 |
| JP | 10215567 | 8/1998 |
| JP | 11299224 | 10/1999 |
| JP | 2000066628 | 3/2000 |
| JP | 2000287439 | 10/2000 |
| JP | 2002223562 | 8/2002 |
| JP | 2002281744 | 9/2002 |
| JP | 2002315313 | 10/2002 |
| WO | 2008011326 A1 | 1/2008 |

OTHER PUBLICATIONS

International Search Report and Written Opinion of the International Searching Authority; Mailed Nov. 27, 2007 ; PCT/US2007/073346; 10 pages.

Japanese Notice of Reasons for Rejection issued in related Japanese Patent Application No. 2005-507156 dated Mar. 11, 2008, and English translation.

Japanese Notice of Reasons for Rejection dated Aug. 26, 2008 issued in related Japanese Patent Application No. 2005-507156 (with English Language translation).

Barry Arbetter, et al., "DC-DC Converter Design for Battery-Operated Systems", IEEE, 1995, pp. 103-109, XP010150545.

Supplemental European Search Report from corresponding European application, dated Jul. 31, 2008.

European Office Action dated Jan. 15, 2009 issued in related European Patent Application No. 03768919.7-1242.

* cited by examiner

CONTROLLER FOR DC TO DC CONVERTER

CROSS REFERENCE TO RELATED APPLICATIONS

This application is a Continuation Application of application Ser. No. 11/269,951 filed Nov. 9, 2005, now U.S. Pat. No. 7,202,650, which itself is a Continuation Application of application Ser. No. 10/389,037 filed Mar. 14, 2003, now U.S. Pat. No. 6,965,221, both of which claim the benefit of the filing date of U.S. Provisional Application Ser. No. 60/425,553, filed Nov. 12, 2002, the teachings all of which are incorporated herein by reference.

FIELD OF THE INVENTION

The present invention relates controllers for DC to DC converters and in particular to controllers for DC to DC converters.

BACKGROUND OF THE INVENTION

DC to DC converters are used to convert an input DC voltage to an output DC voltage. Such converters may step down (buck) or step up (boost) the input DC voltage. One type of buck converter is a synchronous buck converter. This converter typically has a controller, driver, a pair of switches, and an LC filter coupled to the pair of switches. The controller provides a control signal to the driver which then drives the pair of switches, e.g., a high side switch and a low side switch. The driver alternately turns each switch ON and OFF thereby controlling inductor current and the output voltage of the DC to DC converter. Such controllers typically utilize a pulse width modulated signal to control the state of the high and low side switches.

In general, if the PWM signal is high, the high side switch is ON and the low side switch if OFF. This state of switches will be referred to herein as a "switch ON" state. In this state, the inductor is coupled to the input voltage source. In a buck converter, the input voltage is necessarily greater than the output voltage so there is a net positive voltage across the inductor in this switch ON state. Accordingly, the inductor current begins to ramp up. If the PWM signal is low, the high side switch is OFF and the low side switch is ON. This state of switches will be referred to as a "switch OFF" state. In a buck converter, there is a net negative voltage across the inductor in this state. Accordingly, the inductor current begins to ramp down during this low side switch OFF state. Hence, the pulse width of the PWM signal determines the time on for the switch ON state and the time off for the switch OFF state. Such pulse width may be adjusted by directly monitoring the inductor current level via a sense resistor or by comparing the output voltage with a reference voltage level.

Accordingly, there is a need in the art for a controller for a DC to DC converter that provides a PWM signal during a first time interval based on an input voltage to the DC to DC converter less a signal representative of the output voltage.

BRIEF SUMMARY OF THE INVENTION

According to one aspect of the invention, there is provided a DC to DC converter to convert an input voltage to an output voltage. The DC to DC converter may include a pair of switches including a high side switch and a low side switch, an inductor coupled to the pair of switches, and a controller. The controller may be configured to estimate a zero crossing of an inductor current through the inductor without directly measuring the inductor current.

According to another aspect of the invention, there is provided an apparatus comprising a controller for a DC to DC converter. The controller may be configured to estimate a zero crossing of an inductor current through an inductor of the DC to DC converter without directly measuring the inductor current.

According to yet another aspect of the invention there is provided a method. The method may include estimating a zero crossing of an inductor current through an inductor of a DC to DC converter without directly measuring the inductor current.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

Figure 1A:
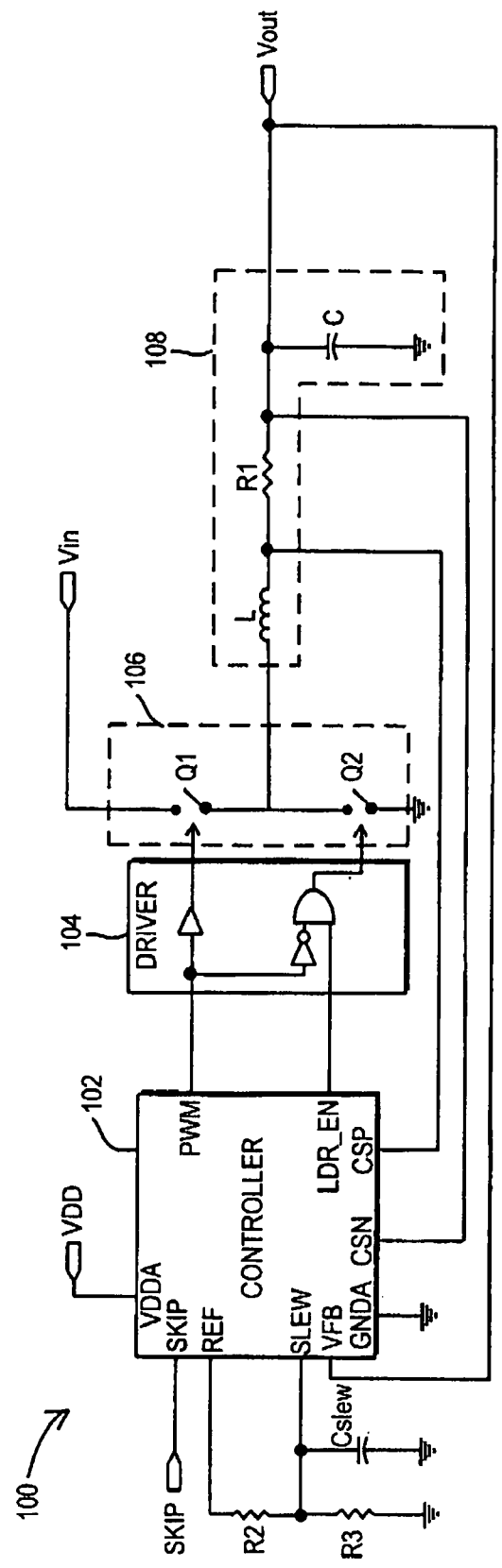
FIG. 1A is a block diagram of a DC to DC converter including a controller consistent with the present invention.

FIG. 1A illustrates an exemplary DC to DC converter 100 including a controller 102 consistent with the present invention. The controller 102 consistent with the invention may be utilized with a variety of DC to DC converters. The illustrated DC to DC converter 100 is a synchronous buck converter generally including the controller 102, a driver circuit 104, a pair of switches 106 including a high side switch Q1 and a low side switch Q2, and a low pass filter 108. The low pass filter includes an inductor L and a capacitor C.

The controller 102 is generally configured to provide a PWM signal and a low side switch enable signal (LDR_EN) to the driver circuit 104. Based on such signals, the driver circuit 104 controls the state of the high side switch Q1 and the low side switch Q2.

The controller 102 has a target input terminal SLEW where the desired output voltage is set. In the exemplary embodiment of FIG. 1A, the slew capacitor Cslew charges based on the value of the resistors in the resistor divider R2/R3 and the value of the reference voltage REF. Those skilled in the art will recognize various ways to charge the slew capacitor Cslew and create the target voltage signal. In this instance, the voltage slews from 0 to a set value due to the slew capacitor Cslew. An optional sense resistor R1 may be utilized to provide a feedback voltage level to terminals CSN and CSP of the controller 102 representative of the current level through the inductor L. In addition, terminal VFB of the controller 102 may accept a feedback signal representative of the output voltage level Vout.

Figure 1B:
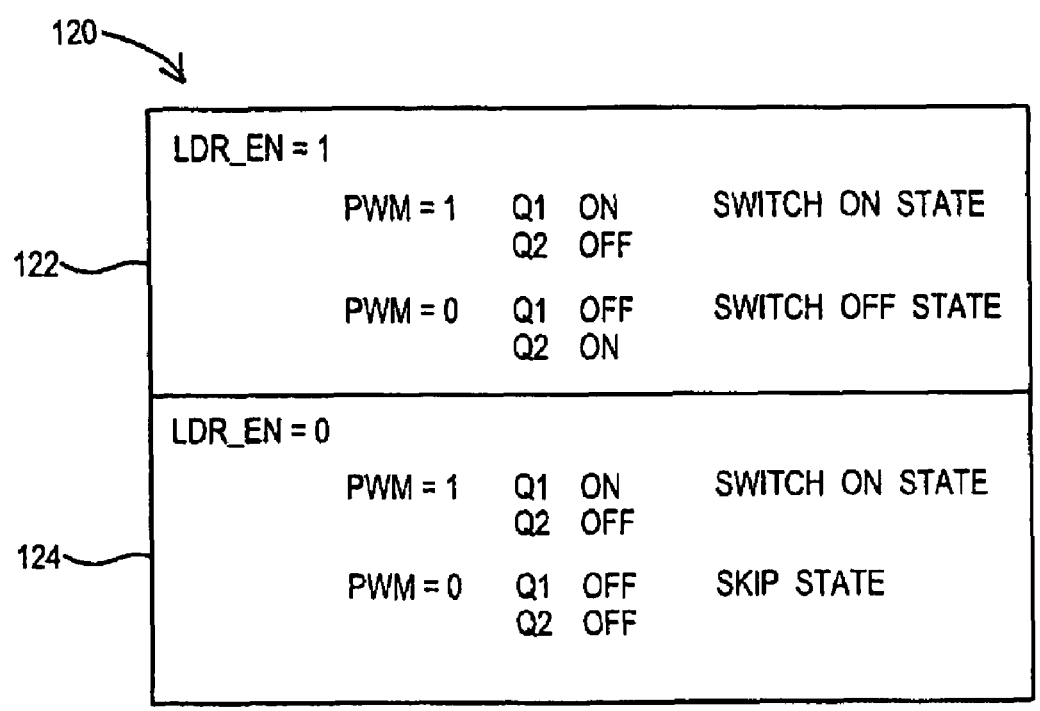
FIG. 1B is an exemplary table illustrating switch states for the pair of switches of FIG. 1A based on the input PWM signal and low side enable signal.

Turning to FIG. 1B, an exemplary table 120 illustrating various switch states of the high side switch Q1 and the low side switch Q2 of FIG. 1A is illustrated for various PWM and LDR_EN signals. If the LDR_EN signal is a digital one as in category 122 of the table 120, then the state of the PWM signal controls the switches Q1 and Q2. For instance, Q1 is ON and Q2 is OFF in this instance 122 if PWM is a digital one. This is referred to as a switch ON state. In addition, Q1 is OFF and Q2 is ON in this instance 122 if PWM is a digital zero. This is referred to as a switch OFF state.

In contrast, if the LDR_EN signal is digital zero and PWM is a digital one, then the switches Q1 and Q2 are in the switch ON state. However, if PWM is a digital zero in this instance, the low side switch Q2 remains open. As such, both the high side switch Q1 and the low side switch Q2 are OFF in this skip state or switch disabled state. The switching side of the inductor L will therefore be left floating in such a skip state.

The inductor L has one end attached to the output DC voltage and the other switch end alternately attached to input voltage Vin or ground depending on the state of the switches Q2 and Q1 (switch ON or switch OFF state). In the switch ON state, the inductor is coupled to input voltage Vin. Neglecting the voltage drop across the sense resistor R1 which is quite small, the voltage difference between the terminals of the inductor L is equal to Vin−Vout. In a buck converter, the input voltage Vin is necessarily larger than the output voltage Vout, so there is a net positive voltage across the inductor and the inductor current ramps up according to equation 1 during the switch ON state.

$$di/dt=(Vin-Vout)/L=\Delta I/Ton \quad (1)$$

In equation 1, Vin is the input voltage to the DC to DC converter, Vout is the output voltage of the DC to DC converter, Ton is the time interval duration that the switches Q1 and Q2 are in the switch ON state, L is the value of the inductor L, and $\Delta I$ is the change in the inductor current during Ton. During the switch OFF state, the voltage across the inductor L is proportional to Vout. In a buck converter in this instance, there is a net negative voltage across the inductor and the inductor current ramps down according to equation 2.

$$di/dt=(Vout)/L=\Delta I/Toff \quad (2)$$

In equation 2, Vout is the output voltage of the DC to DC converter, Toff is the time interval duration that the switches Q1 and Q2 are in the switch OFF state, L is the value of the inductor L, and $\Delta I$ is the change in the inductor current during Toff.

Figure 2A:
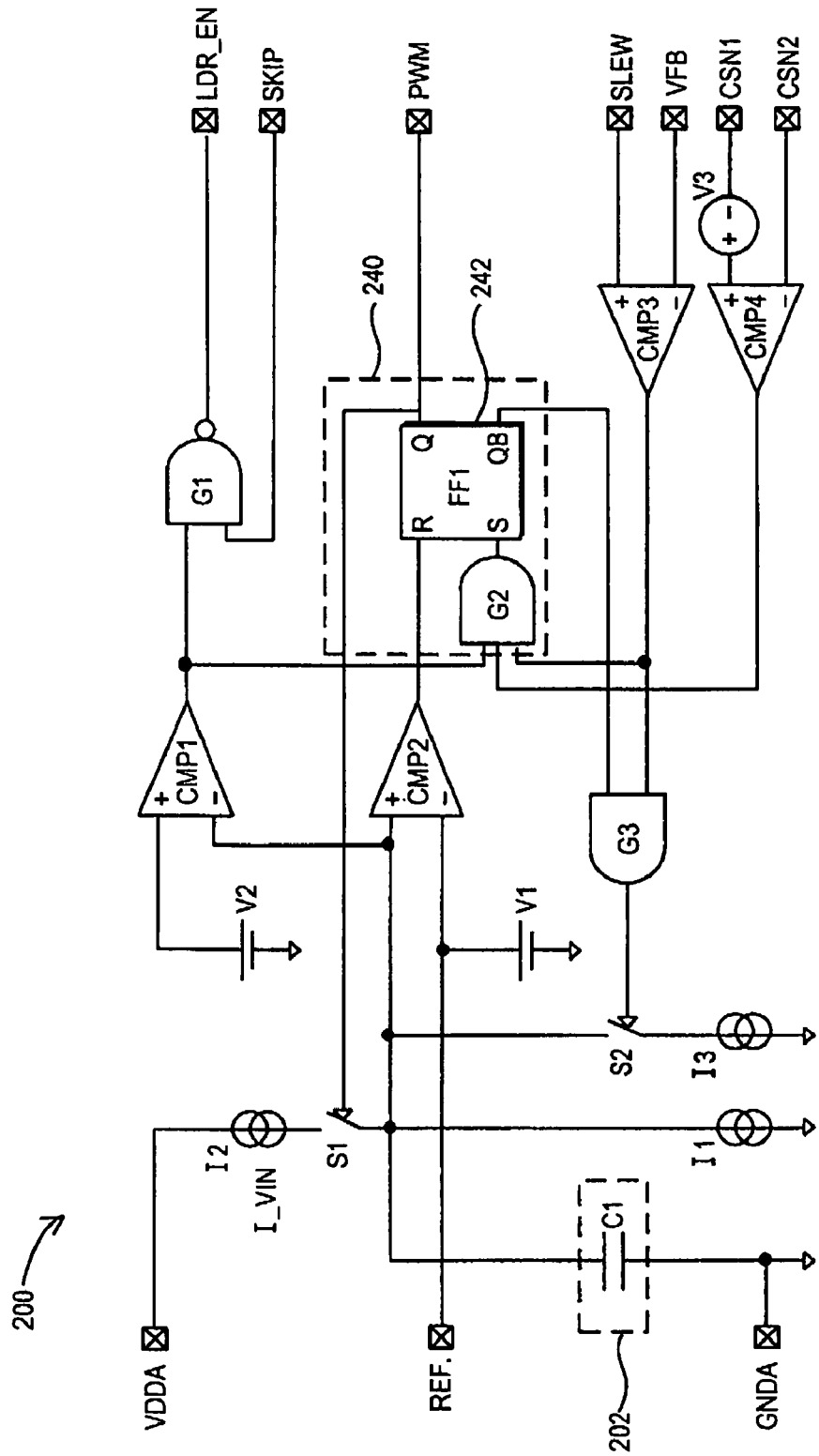
FIG. 2A is a block diagram of one embodiment of a controller for use with the DC to DC converter of FIG. 1.

Turning to FIG. 2A, a more detailed block diagram of one embodiment of a controller 200 for use with the DC to DC converter of FIG. 1 is illustrated. In general, the controller 200 provides a digital one PWM signal to place the switches Q1, Q2 in the switch ON state based on a difference between a first signal representative of the input voltage less a second signal representative of the output voltage. The second signal may be a target voltage level signal, e.g., Vslew, or it may be an output voltage level signal, e.g., Vout. In general, use of a target voltage level signal offers smoother current generation. In a buck converter, the duty cycle of a PWM signal from the controller 200 is generally inversely proportional to the difference between the input voltage and the output voltage or the target voltage. In other words, as this difference increases, the duty cycle of the PWM signal decreases thereby decreasing the "switch ON" time of the switches Q1 and Q2. Conversely, as the difference between the first signal and second signal decreases, the duty cycle of the PWM signal increases thereby decreasing the "switch OFF" time of the switches Q1 and Q2.

In the embodiment of FIG. 2A, such control is generally dictated by charging an energy storage element 202 during a first time interval and discharging the energy storage element 202 during a second time interval. During the first time interval the PWM output signal is a digital one and hence the switches Q1 and Q2 are in the switch ON state and the inductor current rises in proportion to the charge on the energy storage element 202. Once the charge on the energy storage element 202 reaches a predetermined charge threshold level, the PWM signal changes to a digital zero and hence the switches are driven to the switch OFF state. Accordingly, the inductor current then decreases in proportion to the decrease in the charge on the energy storage element 202.

The controller 200 may generally include various current sources I1, I2, and I3 for charging and discharging the energy storage element 202 based on the results of various voltage comparisons by comparators CMP2, CMP3, and CMP4. The first current source I1 is proportional to the output voltage or a target voltage, e.g., Vslew, and configured to provide a first current level and the second current source I2 is proportional to the input voltage of the DC to DC converter and configured to provide a second current level. Finally, a third current source I3 is proportional to the output voltage and configured to provide a third current level which is typically, but not necessarily, greater than the first current level. The third current source I3 is not mandatory. However, it helps to filter out the parasitic triggering of a new PWM pulse. If the third current source I3 is not utilized, switch S2 can directly discharge the energy storage element 202. The controller 200 may also include an output decision circuit 240 to provide the PWM signal to the switch driver circuit.

The controller 200 may further include a first comparator CMP1 that is configured to compare the charge on the energy storage element 202, e.g., capacitor C1, with a second voltage reference V2. The second voltage reference may be a nominal value, e.g., 20 mV in one embodiment, coupled to the positive terminal of the comparator CMP1 such that CMP1 provides a high signal if the charge on the energy storage element is below the nominal V2 value.

The output of the comparator CMP1 may be further coupled to NAND gate G1. A SKIP input may also be coupled to another input of the NAND gage G1. If the SKIP signal is digital zero, then the LDR_EN signal is a digital one regardless of the signal from the comparator CMP1 and hence the PWM signal controls the state of the switches Q1, Q2. If however, SKIP is a digital one and the output from CMP1 is digital one, then the output of NAND gate G1 is a digital zero. As such, if PWM is a digital zero, then both switches Q1 and Q2 will be driven OFF.

In operation, the charge on the energy storage element 202 is initially set at zero volts since it is discharged to ground and the output decision circuit 240 provides a digital zero PWM signal. When the controller is enabled, the SLEW voltage will start to increase from zero towards the ratio based on R2 and R3. The comparator CMP3 will then sense the SLEW voltage is greater than the feedback voltage VFB, which is representative of the output voltage Vout, and provide a digital one signal to the AND gate G2 of the output decision circuit 240.

Since there is no current yet through the inductor L, the comparator CMP4 does not sense an over-current condition and provides a digital one signal to the AND gate G2. In addition, since the charge on the energy storage element 202 element has been discharged to zero volts, the output signal of the comparator CMP1 is also a digital one when comparing the charge to the nominal voltage threshold V2. As such, all input signals to the AND gate G2 are a digital one and the flip flop 242 is set. At that moment, the PWM signal goes to a digital one and switch S1 is closed.

When switch S1 is closed, the energy storage element 202 is charged by a current level equal to the second current level provided by the second current source I2 less the first current level provided by the first current source I1. Advantageously, the first current source I1 may provide a first current level representative of the output voltage, e.g., this may be directly proportional to the output voltage level, e.g., Vout, or a target voltage level, e.g., Vslew or Vtarget. As such, the energy storage element 202 is charged with a current level proportional to I (Vin−Vout) or (Vin−Vslew).

The energy storage element 202 is charged until it reaches a predetermined threshold voltage level, e.g., V1 or 2.5 volts in one embodiment. The comparator CMP2 compares the charge on the energy storage element 202 with the predetermined threshold voltage level V1 and provides an output signal to the output decision circuit 240 based on the difference. If the charge on the energy storage element 202 reaches the predetermined threshold voltage level V1, then comparator CMP2 will output a digital one signal to the reset terminal R of the flip flop 242 resetting the flip flop so its output Q is moved to a digital zero and hence the PWM signal is also moved to a digital zero.

At this time, switch S1 is open since output Q is a digital zero. As such, the energy storage element 202 is now discharged by current source I1. An accelerated discharge of the energy storage element 202 may also occur if the output of the AND gate G3 is a digital one. This occurs if the PWM signal is a digital zero hence one input to the AND gate G3 from the QB terminal of the flip flop 242 is a digital one. In addition, the other input to the AND gate G3 from comparator CMP3 is a digital one if the feedback voltage VFB signal is less than the SLEW voltage. As such, a digital one from the AND gate G3 will close switch S2. As such, a third current source I3 may also be coupled to the energy storage element 202 to provide an accelerated discharge. In one embodiment, the current source I3 has a value of 10×I_Vout, but its value can be adjusted depending on the particular energy storage element 202 and other parameters to find a desired accelerated discharge level. Alternatively, the third current source I3 may be replaced by a short such that switch S2 will discharge the energy storage element to ground.

The voltage level on the energy storage element 202 will continue to be discharged while the PWM signal is a digital zero. It may be discharged at a normal rate or an accelerated rate depending on a comparison of the SLEW voltage with the feedback voltage VFB as provided by comparator CMP3.

Once the voltage level on the energy storage element 202 is discharged to a value less than the nominal threshold level V2 (hence the output of comparator CMP1 is a digital one), and the outputs of comparators CMP3 and CMP4 are also a digital one, a new PWM pulse is generated as the output Q of the flip flop goes to a digital one.

Figure 2B:
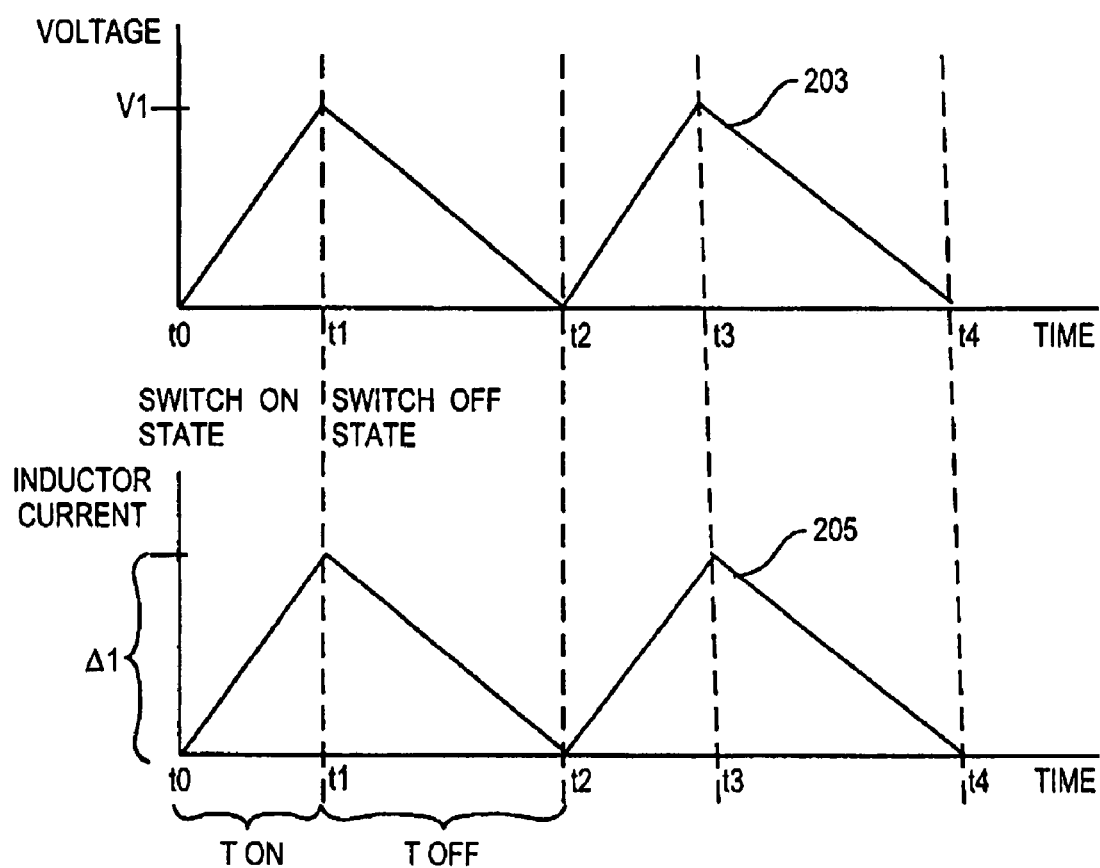
FIG. 2B is a plot illustrating the changes in charge level on the energy storage element of the controller of FIG. 2A compared to the associated changes in inductor current levels over similar time intervals.

Turning to FIG. 2B in conjunction with FIG. 2A, a plot 203 of the voltage level on the energy storage element 202 over time is illustrated. In addition another plot 205 of the inductor current level in inductor L is illustrated over similar time intervals. For instance, at the start time (t0) of operation of the controller 200 the charge on the energy storage element is zero volts. Over a first time interval or Ton between time to and t1 when the PWM output signal is a digital one, the voltage level on the energy storage element 202 rises linearly until the charge level reaches a predetermined charge threshold level V1, e.g., 2.5 volts in one embodiment.

As such, Ton between time t0 and t1 depends on the difference between a signal representative of the input voltage Vin and a signal representative of the output voltage, e.g., Vout or Vtarget, since the energy storage element 202 is charged during this time interval with a current level equal proportionate to this difference (current source I2−I1). The duration of Ton also depends on the threshold voltage level V1 and the value of the energy storage element 202. Where the energy storage element is a capacitor C1 and the second current source is directly proportional to Vout, the duration of the Ton is given by equation 3 below:

$$Ton = C1 * V1/I(Vin-Vout) \qquad (3)$$

Where C1 is the value of the capacitor C1, V1 is predetermined charge threshold level (2.5 volts in one example) and I (Vin−Vout) is the value of the charging current provided by the difference between the second current source I2 and the first current source I1 when the second current source is directly proportional to Vout.

If the Ton as represented in equation (3) is utilized as the Ton for the inductor current in equation (1), then equation (1) can be rewritten as $$\Delta I = (Vin-Vout)*(C1*V1/I(Vin-Vout))/L \qquad (4)$$

Since (Vin−Vout)/I(Vin−Vout) is constant then $\Delta I$=constant because every other term (L, V1, and C1) is a constant.

As such, during the Ton state between t0 and t1, the inductor current rises proportionately to the rise in the voltage level of the energy storage element 202. During a second time interval between t1 and t2, the charge level on the energy storage element is decreased due to discharging. In comparison, the inductor current level also decreases over this time period. Advantageously, when the charge level on the energy storage element 202 reaches zero, e.g., at time t2, the inductor current level at time t2 should be zero. As such, the controller 200 also provides a zero crossing inductor current estimator.

The skipping mode when enabled (when the SKIP signal is a digital one) uses this fact that for every PWM pulse the starting inductor current is zero and the energy storage element is completely discharged. When the energy storage element is discharged below the nominal value V2, the output of the comparator CMP1 becomes a digital one. If the skipping mode is enabled then LDR_EN is forced to a digital zero through AND gate G1. So when the inductor current crosses zero, the low side switch Q2 will be OFF as well the high side switch Q1. Therefore, the switching side of the inductor L will be left floating. The skipping mode is useful for light load conditions because a new PWM cycle will start when the load discharges the energy storage element, thus minimizing the Q1 and Q2 switching and conduction losses.

Figure 3:
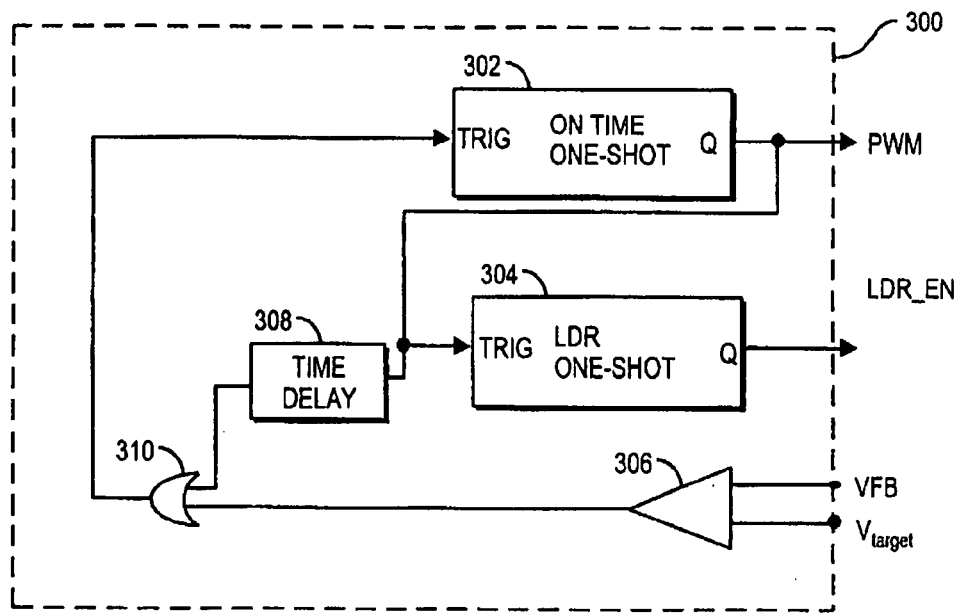
FIG. 3 is a block diagram of another embodiment of a controller for use with the DC to DC converter of FIG. 1.

Turning to FIG. 3, another embodiment of a controller 300 consistent with the invention is illustrated. Similar to the embodiment of FIG. 1A, the controller 300 provides a PWM control signal to an associated driver circuit based on the input voltage to the associated DC to DC converter less a signal representative of the output voltage, e.g., Vout or Vtarget. However, rather than charge and discharge an energy storage element, the controller 300 essentially counts blocks of time and provides the appropriate PWM and LDR_EN signal based on such counts.

For instance, the controller 300 may generally include an on-time one shot circuit 302, a low side driver one shot circuit 304, a comparator 306, a time delay circuit 308, and a NOR gate 310. The time delay circuit 308 may be a blanking circuit for generating retriggering of the on-time one shot circuit 302. The one shot circuits 302 and 304 may be triggered by the falling edge of the input signals.

Ideally, the on-time for the one shot circuit 302 is proportional to difference between the input voltage Vin of the DC to DC converter and a target voltage Vtarget for the output of the DC to DC converter and $T_{LDR}$ is proportional to Vtarget as detailed in equation (5).

$$\frac{T_{on}}{T_{LDR}} \cong \frac{V_{target}}{V_{in} - V_{target}} \quad (5)$$

In practice, $T_{LDR}$ is typically chosen to be slightly shorter than suggested by equation (5). There are several ways to produce Ton/$T_{LDR}$. Typically, Vtarget is either a fixed value or one changing in discrete steps. Both delays for the one shot circuits 302 and 304 can be digital with the actual delay being a multiple of an elementary time delay, e.g., delay To as given by equations (6) and (7) below.

$$Ton = To1 * M \quad (6)$$

$$T_{LDR} = To2 * N \quad (7)$$

Figure 4:
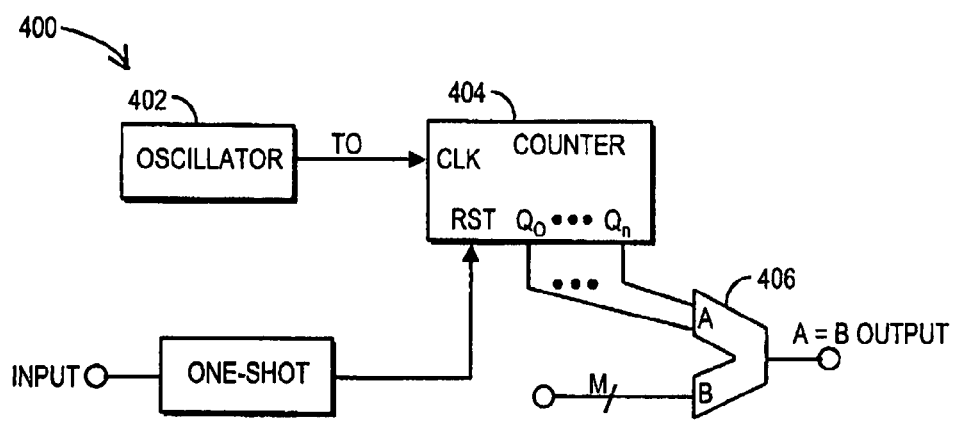
FIG. 4 is a more detailed block diagram of an exemplary delay circuit of FIG. 3.

Turning to FIG. 4, an exemplary delay circuit 400 is illustrated for producing the desired delay to maintain a proper time on for the on-time one shot circuit 302. The delay circuit 400 generally includes an oscillator 402 for producing time pulses, a counter 404 for counting the time pulses, and a digital comparator 406 for comparing the counted value to an applicable multiple such as M or N. The comparator thus provides an output signal indicative of whether or not the counter 404 has reached the necessary amount of counts M or N. Therefore, the applicable on time is controlled by counting the number of counts compared to the multiple M or N.

Hence controlling the multiple M and N essentially selects the applicable delay. Since Ton is a function of Vin and Vtarget and $T_{LDR}$ is a function of Vtarget, there are a couple of ways to control them. In a first case, To1 and To2 are equal and constant. As such, the multiple N may be produced by a lookup table (LUT) from the digital signal that sets Vtarget. The LUT in this instance is one dimensional since various N values correspond to an associated Vtarget value. In the same case where To1 and To2 are equal and constant, the multiple M may be produced by a LUT from both the digital signal that sets Vtarget and a digitalized Vin signal. Such a digitalized Vin signal may be obtained by utilizing an AD converter on Vin. As such, the LUT to produce M in this instance is bi-dimensional since M values correspond to an associated Vtarget and Vin values.

In another case, To1 and To2 are not equal. In this case, the multiple N is produced similarly as in the first case if To2 is constant. The multiple M may be produced by a uni-dimensional LUT having as an input the digital signal that sets Vtarget. However, To1 is not longer fixed but a function of either Vin or a function of both Vin and Vtarget.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. A DC to DC converter to convert an input voltage to an output voltage,
said DC to DC converter comprising: a pair of switches comprising a high side switch and a low side switch;
an inductor coupled to said pair of switches;
and a controller configured to estimate a zero crossing of an inductor current through said inductor, said controller is further configured to provide a pulse width modulated (PWM) signal and a low side switch enabling signal, said low side switch responsive to said PWM signal and said low side switch enabling signal, said controller is further configured to provide a pulse width modulated (PWM) signal and a low side switch enabling signal, said controller comprising a capacitor, wherein said zero crossing of said inductor current is estimated by monitoring when a charge on said capacitor is less than a low voltage threshold, said controller including a first current source configured to provide a first current level and a second current source configured to provide a second current level, said controller further including a capacitor configured to be charged by a charging current equal to said second current level less said first current level during a first time interval, wherein said first time interval has a start time and an end time, said start time occurring when a charge level on said capacitor is substantially zero and said end time occurring when a charge level of said capacitor is greater than a charge threshold level, wherein said zero crossing of said inductor current is estimated by said start time of said first time interval.

2. The DC to DC converter of claim 1, wherein said controller configured to provide said PWM signal in a digital one state during a first time interval that is inversely proportional with said input voltage less said output voltage.

3. The DC to DC converter of claim 1, wherein said high side switch is responsive to said PWM signal and said low side switch is responsive to said PWM signal and said low side switch enabling signal to have said high and low side switches switch to a switch ON state when said PWM signal is a digital one and said low side switch enabling signal is a digital one, said high and low side switches further configured to switch to a switch OFF state when said PWM signal is a digital zero and said low side switch enabling signal is a digital one, said high and low side switches further configured to both switch OFF in a skip state when said low side enabling signal is a digital zero and said PWM signal is a digital zero.

4. The DC to DC converter of claim 1, wherein said capacitor is discharged during a second time interval, and wherein said controller provides said PWM signal in a digital zero state during said second time interval, wherein said second time interval has a start time and an end time, said start time of said second time interval occurring when a charge level of said capacitor is greater than said charge threshold level and said end time of said second time interval occurring when a charge level of said capacitor is substantially zero, wherein said zero crossing of said inductor current is estimated by said end time of said second time interval.

5. An apparatus comprising: a controller for a DC to DC converter, said controller configured to estimate a zero crossing of an inductor current through an inductor of said DC to DC converter, said controller is further configured to provide a pulse width modulated (PWM) signal and a low side switch enabling signal, said DC to DC converter having a high side switch and a low side switch, wherein said low side switch is responsive to said PWM signal and said low side switch enabling signal, said controller is further configured to provide a pulse width modulated (PWM) signal and a low side switch enabling signal, said controller comprising a capacitor, wherein said zero crossing of said inductor current is estimated by monitoring when a charge on said capacitor is less than a low voltage threshold, said controller configured to provide said PWM signal in a digital one state during a first time interval that is inversely proportional with an input voltage of said DC to DC converter less an output voltage of said DC to DC converter.

6. The apparatus of claim 5, wherein said controller comprises: a first current source configured to provide a first current level;

a second current source configured to provide a second current level;

and a capacitor configured to be charged by a charging current equal to said second current level less said first current level during a first time interval, wherein said first time interval has a start time and an end time, said start time occurring when a charge level on said capacitor is substantially zero and said end time occurring when a charge level on said capacitor is greater than a charge threshold level, wherein said zero crossing of said inductor current is estimated by said start time of said first time interval.

7. The apparatus of claim 6, wherein said capacitor is discharged during a second time interval, and wherein said controller provides said PWM signal in a digital zero state during said second time interval, wherein said second time interval has a start time and an end time, said start time of said second time interval occurring when a charge level of said capacitor is greater than said charge threshold level and said end time of said second time interval occurring when a charge level of said capacitor is substantially zero, wherein said zero crossing of said inductor current is estimated by said end time of said second time interval.

8. A method comprising:

estimating a zero crossing of an inductor current through an inductor of a DC to DC convener by monitoring a charge on a capacitor of a controller for said DC to DC convener, said zero crossing occurring when a charge level of said capacitor is less than a low voltage threshold;

providing a pulse width modulated (PWM) signal in a digital one state, a high side switch of said DC to DC converter switching ON in response to said PWM signal in said digital one state;

and determining a time interval to maintain said PWM signal in said digital one state, said time interval inversely proportional with an input voltage of said DC to DC convener less an output voltage of said DC to DC convener said controller including a first current source configured to provide a first current level and a second current source configured to provide a second current level, said capacitor configured to be charged by a charging current equal to said second current level less said first current level during a first time interval, wherein said first time interval has a start time and an end time, said start time occurring when a charge level on said capacitor is substantially zero and said end time occurring when a charge level of said capacitor is greater than a charge threshold level, wherein said zero crossing of said inductor current is estimated by said start time of said first time interval.

9. The method of claim 8, wherein said zero crossing of said inductor current is estimated by monitoring a charge on a capacitor of a controller for said DC to DC convener, said zero crossing occupying when a charge level of said capacitor is substantially zero.

10. The method of claim 8, wherein said zero crossing of said inductor current is estimated by counting a plurality of pulses.

* * * * *